US011585665B2

(12) United States Patent
Suzuki

(10) Patent No.: US 11,585,665 B2
(45) Date of Patent: Feb. 21, 2023

(54) THREE-DIMENSIONAL MAP GENERATION SYSTEM, THREE-DIMENSIONAL MAP GENERATION METHOD, AND COMPUTER READABLE MEDIUM

(71) Applicant: Mitsubishi Electric Corporation, Chiyoda-ku (JP)

(72) Inventor: Toshiharu Suzuki, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 379 days.

(21) Appl. No.: 16/766,093

(22) PCT Filed: Nov. 27, 2018

(86) PCT No.: PCT/JP2018/043630
§ 371 (c)(1),
(2) Date: May 21, 2020

(87) PCT Pub. No.: WO2019/107367
PCT Pub. Date: Jun. 6, 2019

(65) Prior Publication Data
US 2020/0355505 A1 Nov. 12, 2020

(30) Foreign Application Priority Data

Nov. 30, 2017 (JP) .............................. JP2017-229762

(51) Int. Cl.
*G01C 21/30* (2006.01)
*G06T 7/521* (2017.01)
*G01B 11/24* (2006.01)
(52) U.S. Cl.
CPC .............. *G01C 21/30* (2013.01); *G01B 11/24* (2013.01); *G06T 7/521* (2017.01); *G06T 2207/10028* (2013.01)

(58) Field of Classification Search
None
See application file for complete search history.

(56) References Cited

U.S. PATENT DOCUMENTS 6,304,818 B1  10/2001  Kamiya
2011/0246073 A1*  10/2011  Ma .......................... G01S 17/89
  702/2

(Continued)

FOREIGN PATENT DOCUMENTS

EP   3 404 358 A1   11/2018
JP   2000-321086 A  11/2000

(Continued)

OTHER PUBLICATIONS

International Search Report dated Jan. 8, 2019 in PCT/JP2018/043630 filed on Nov. 27, 2018, 1 page.

(Continued)

*Primary Examiner* — Rebecca A Volentine
(74) *Attorney, Agent, or Firm* — Oblon, McClelland, Maier & Neustadt, L.L.P.

(57) ABSTRACT

A three-dimensional map generation system generates three-dimensional map information using measured data acquired by a measuring vehicle which moves within a measurement area. A generation unit regards a data lacking area which is acquired from the measurement area based on first measured data transmitted from the measuring vehicle and which lacks measured data for generating a three-dimensional map, as a defective area, and generates interpolation data for interpolating three-dimensional map information of the defective area.

19 Claims, 11 Drawing Sheets

(56) References Cited

U.S. PATENT DOCUMENTS

| | | | | |
|---|---|---|---|---|
| 2012/0314037 | A1* | 12/2012 | Nehmadi | G01C 11/06 348/51 |
| 2016/0350601 | A1* | 12/2016 | Grau | G06F 16/5866 |
| 2018/0081995 | A1* | 3/2018 | Horhammer | G06F 16/283 |
| 2018/0259968 | A1* | 9/2018 | Frazzoli | B60W 10/184 |
| 2019/0189006 | A1* | 6/2019 | Toma | G05D 1/02 |

FOREIGN PATENT DOCUMENTS

| | | |
|---|---|---|
| JP | 2003-203243 A | 7/2003 |
| JP | 2004-294953 A | 10/2004 |
| JP | 2010-191066 A | 9/2010 |
| JP | 2013-40886 A | 2/2013 |
| JP | 2014-232111 A | 12/2014 |
| JP | 2017-49172 A | 3/2017 |
| JP | 2017-90239 A | 5/2017 |
| JP | 2017-223511 A | 12/2017 |
| WO | WO 2017/154061 A1 | 9/2017 |

OTHER PUBLICATIONS

Japanese Office Action dated Jun. 25, 2019 in Japanese Patent Application No. 2019-517860, (with English translation) (total 7 pages).

Japanese Office Action dated Oct. 29, 2019 in Japanese Patent Application No. 2019-517860, (with English translation) (total 5 pages).

Shirato, "Dynamic Map: Results of Year 2016 and Future Challenges," Cross-ministerial Strategic Innovation Promotion Program, 28$^{th}$ SIP Autonomous System Promotion Committee, Mar. 2017 (with English translation) (total 10 pages).

Seto, et al., "Propose the Mapping Method Filling the Data Gap in LRF by Using a RGB-D Sensor," The Japan Society of Mechanical Engineers, No. 13-2 Proceedings of the 2013 JSME Conference on Robotics and Mechatronics, May 2013 (with English abstract) (total 5 pages).

"Mitsubishi Electric Mfg developed new technology of Mobile Mapping System," News / Archive, Michibiki (Quasi-Zenith Satellite System: QZAA), Providing highly accurate position information using Japan's unique satellite positioning system, Cabinet Office, Government of Japan, Jul. 2015, URL: https://web.archive.org/web/20170902162323/https://qzss.go.jp/news/archive/mms_150703.html (with partial English translation) (total 6 pages).

* cited by examiner

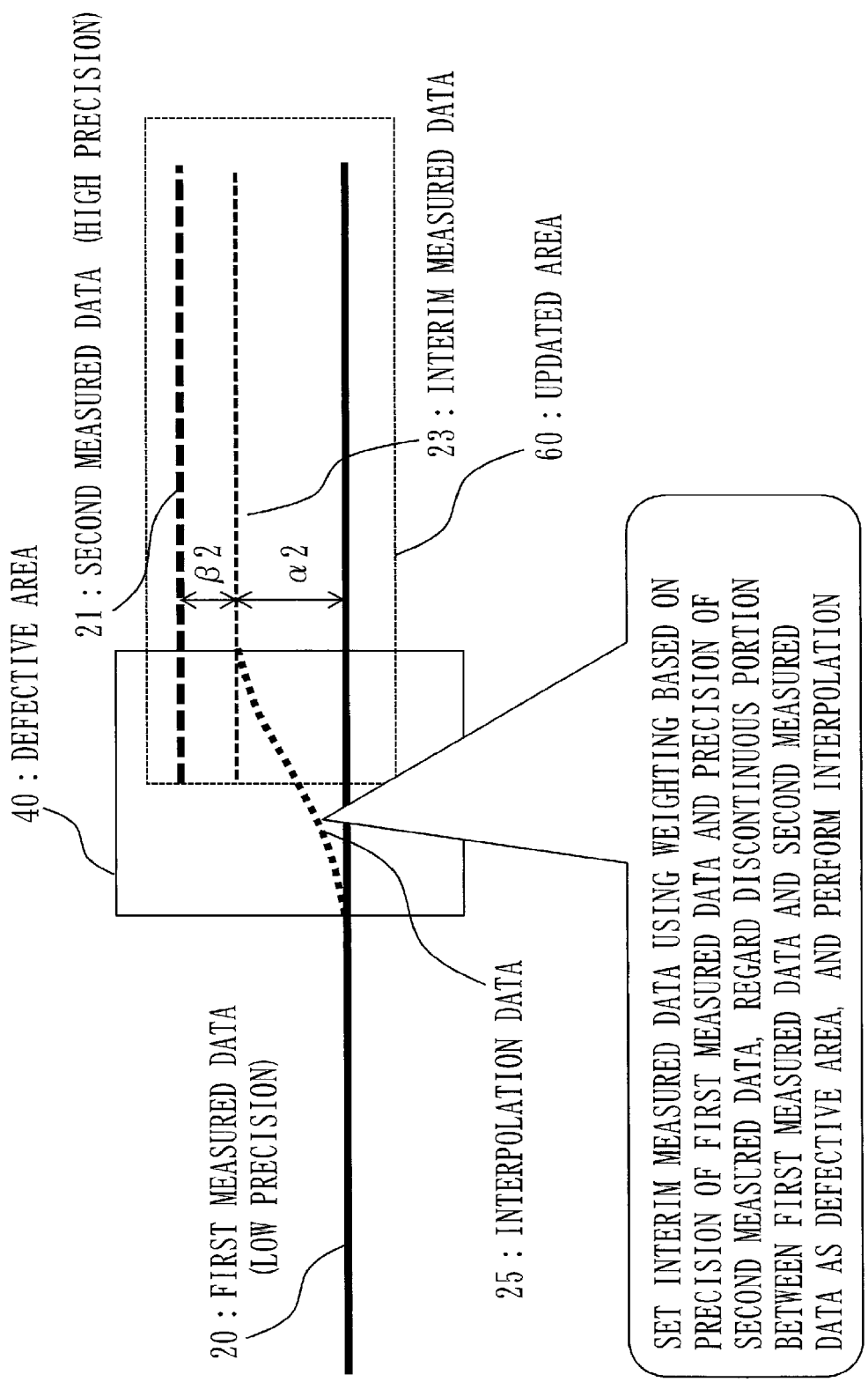

THREE-DIMENSIONAL MAP GENERATION SYSTEM, THREE-DIMENSIONAL MAP GENERATION METHOD, AND COMPUTER READABLE MEDIUM

TECHNICAL FIELD

The present invention relates to a three-dimensional map generation system, a three-dimensional map generation device, a three-dimensional map generation method, and a three-dimensional map generation program which generate a high-precision three-dimensional map. Particularly, the present invention relates to a three-dimensional map generation system, a three-dimensional map generation method, and a three-dimensional map generation program which interpolate a lacking portion of measured data by interpolation.

BACKGROUND ART

A dynamic map high-precision platform system for generating a high-precision three-dimensional map, that is, a dynamic map, used for automated driving has been developed. The dynamic map high-precision platform system generates a high-precision three-dimensional map, that is, a dynamic map, using three-dimensional point cloud data measured by a mobile mapping system (MMS).

CITATION LIST

Non-Patent Literature

Non-Patent Literature 1: "Dynamic Map: Results of Year 2016 and Future Challenges" http://www8.cao.go.jp/cstp/gaiyo/sip/iinkai/jidousoukou_28/siryo28-1-2-1-1.pdf

SUMMARY OF INVENTION

Technical Problem

At present, a problem is posed that if three-dimensional point cloud data, which is data measured by MMS, involves an unmeasured portion, a defective area having no three-dimensional point cloud data is produced in a high-precision three-dimensional map.

An objective of the present invention is to provide a three-dimensional map generation system capable of appropriately interpolating a defective area in a high-precision three-dimensional map if measured data involves an unmeasured portion.

Solution to Problem

A three-dimensional map generation system according to the present invention generates three-dimensional map information expressing a three-dimensional map used for automated driving, using measured data acquired by a measuring vehicle which moves within a measurement area, and includes a generation unit to regard a data lacking area which is acquired from the measurement area based on first measured data transmitted from the measuring vehicle and which lacks measured data for generating the three-dimensional map, as a defective area, and to generate interpolation data for interpolating three-dimensional map information of the defective area.

Advantageous Effects of Invention

The three-dimensional map generation system according to the present invention provides an effect that, if a three-dimensional map involves a defective area that lacks measured data, the defective area can be interpolated appropriately.

BRIEF DESCRIPTION OF DRAWINGS

FIG. 11 is a schematic diagram illustrating an example of interpolation processing according to Embodiment 5.

DESCRIPTION OF EMBODIMENTS

Figure 1:
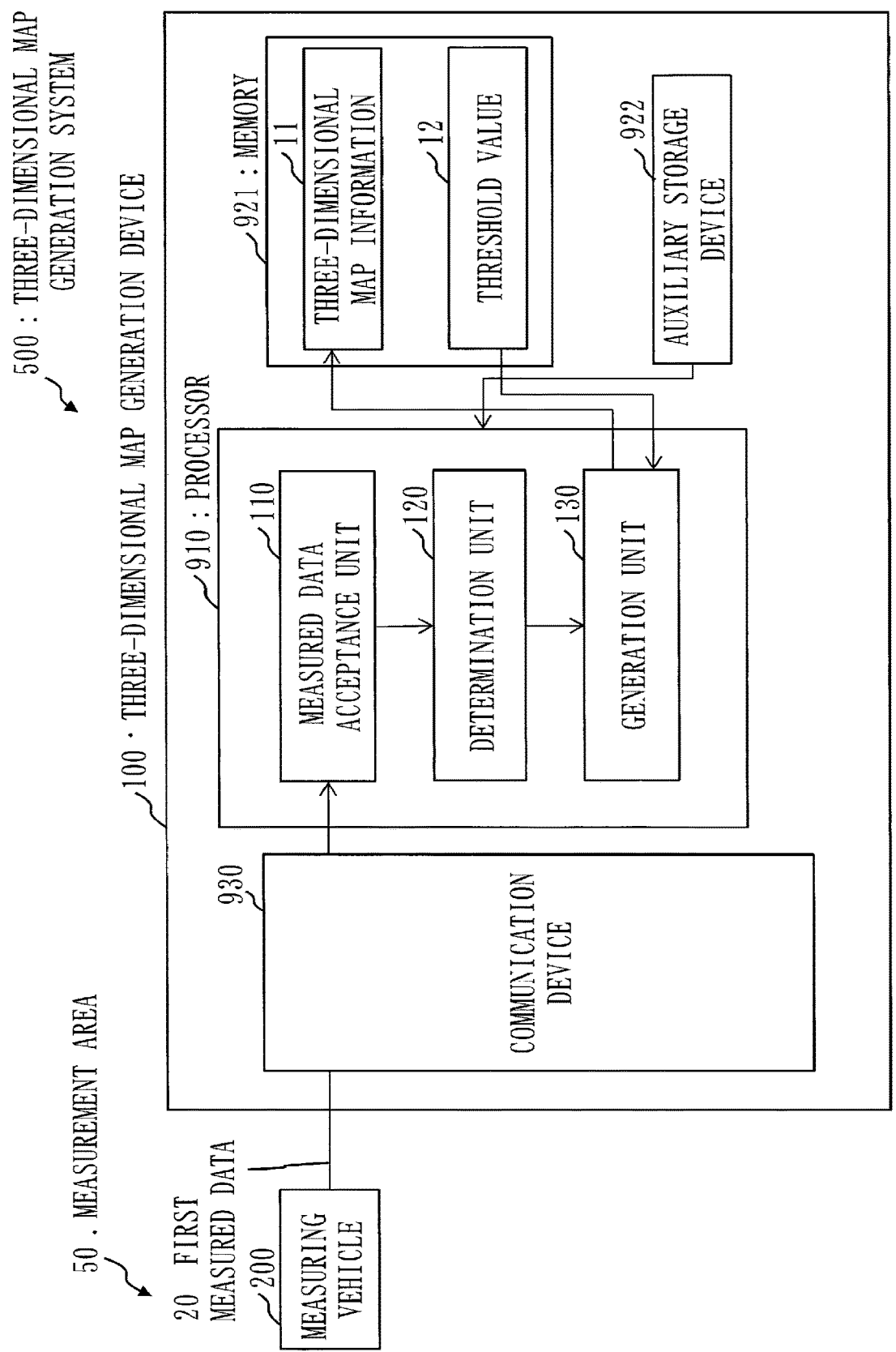
FIG. 1 is a configuration diagram of a three-dimensional map generation system and three-dimensional map generation device according to Embodiment 1.

Embodiments of the present invention will now be described with referring to drawings. In the drawings, the same or equivalent portion is denoted by the same reference numeral. In description of the embodiments, explanation on the same or equivalent portion is appropriately omitted or simplified.

Embodiment 1

\*\*\*Description of Configuration\*\*\*

FIG. 1 is a configuration diagram of a three-dimensional map generation system 500 and three-dimensional map generation device 100 according to the present embodiment.

The three-dimensional map generation system 500 according to the present embodiment generates three-dimensional map information 11 expressing a three-dimensional map used for automated driving, using first measured data 20 acquired by a measuring vehicle 200 which moves within a measurement area 50.

The three-dimensional map generation system 500 is provided with the three-dimensional map generation device 100 and the measuring vehicle 200.

The three-dimensional map generation device 100 generates the three-dimensional map information 11 expressing the three-dimensional map used for automated driving and the like. The three-dimensional map information 11 is also called high-precision three-dimensional map or dynamic map.

The measuring vehicle 200 is an MMS measuring vehicle which measures the first measured data 20 by the MMS. The first measured data 20 is MMS measured data. An MMS is a device according to which apparatuses such as a global positioning system (GPS) and a laser scanner camera are mounted on a vehicle so as to acquire, while traveling, three-dimensional position information on and around a road, such as shapes of a building and the road, a road sign, a guardrail, a road-surface character, and a maintenance hole, efficiently and at high precision. The MMS utilizes global navigation satellite system (GNSS) positioning, which measures a present position on the ground, utilizing an artificial satellite, by taking the entire globe as a positioning target.

The three-dimensional map generation system 500 is a system that is involved in a dynamic map center. The dynamic map center generates a high-precision three-dimensional map, being a platform map used for automated driving and so on, that is, a dynamic map. The high-precision three-dimensional map generated at the dynamic map center is mainly static information. The dynamic map center acquires MMS measured data from the MMS measuring vehicle to generate, update, and manage the high-precision three-dimensional map. When the high-precision three-dimensional map is completed, the dynamic map center delivers the high-precision three-dimensional map to an organization such as a map supplier.

If the MMS measured data involves data lack, a defective area having no corresponding MMS measured data is produced in the high-precision three-dimensional map. Following is an example of a case where the MMS measured data involves data lack.

When there is an automobile traveling parallel to the MMS measuring vehicle, or when there is a parked/stopped vehicle, reflection data from the road surface cannot be obtained, and accordingly corresponding MMS measured data is lacking. When the road surface condition indicates that the road is wet due to a weather event such as rain or snow, sometimes reflection data from the road surface cannot be obtained, and accordingly corresponding MMS measured data is lacking. When there is an unmeasured section on a boundary between a piece of MMS measured data and another piece of MMS measured data, corresponding MMS measured data is lacking.

The three-dimensional map generation device 100 is a computer. The three-dimensional map generation device 100 is provided with a processor 910 as well as other hardware devices such as a memory 921, an auxiliary storage device 922, and a communication device 930. The processor 910 is connected to the other hardware devices via a signal line and controls the other hardware devices.

The three-dimensional map generation device 100 is provided with a measured data acceptance unit 110, a determination unit 120, and a generation unit 130, as function elements. The three-dimensional map information 11 is stored in the memory 921.

Functions of the measured data acceptance unit 110, determination unit 120, and generation unit 130 are implemented by software.

The processor 910 is a device that executes a three-dimensional map generation program. The three-dimensional map generation program is a program that implements the functions of the measured data acceptance unit 110, determination unit 120, and generation unit 130.

The processor 910 is an integrated circuit (IC) which performs computing processing. Specific examples of the processor 910 include a CPU, a digital signal processor (DSP), and a graphics processing unit (GPU).

The memory 921 is a storage device which stores data temporarily. Specific examples of the memory 921 include a static random access memory (SRAM) and a dynamic random access memory (DRAM). Information such as the three-dimensional map information 11 and a threshold value 12 are stored in the memory 921.

The auxiliary storage device 922 is a storage device which stores data. Specific examples of the auxiliary storage device 922 include an HDD. Alternatively, the auxiliary storage device 922 may be a portable storage medium such as an SD (registered trademark) memory card, a CF, a NAND flash, a flexible disk, an optical disk, a compact disk, a blu-ray (registered trademark) disk, and a DVD. Note that HDD stands for hard disk drive, SD (registered trademark) stands for secure digital, CF stands for compact flash (registered trademark), and DVD stands for digital versatile disk.

The communication device 930 communicates with the other devices via a network. The communication device 930 has a receiver and a transmitter. The communication device 930 is connected to a network such as a LAN, the Internet, and a telephone line by wired or wireless connection. The communication device 930 is specifically a communication chip or a network interface card (NIC). The three-dimensional map generation device 100 receives the first measured data 20 from the measuring vehicle 200 via the communication device 930.

The three-dimensional map generation program is read by the processor 910 and executed by the processor 910. Not only the three-dimensional map generation program but also an operating system (OS) is stored in the memory 921. The processor 910 executes the three-dimensional map generation program while executing the OS. The three-dimensional map generation program and the OS may alternatively be stored in the auxiliary storage device 922. The three-dimensional map generation program and OS stored in the auxiliary storage device 922 are loaded to the memory 921 and executed by the processor 910. The three-dimensional map generation program may be incorporated in the OS partially or entirely.

Data, information, a signal value, and a variable value which are utilized, processed, or outputted by the three-dimensional map generation program are stored in the memory 921, the auxiliary storage device 922, or a register or cache memory in the processor 910.

The "unit" in each of the measured data acceptance unit 110, determination unit 120, and generation unit 130 may be replaced by "process", "procedure", or "stage". The three-dimensional map generation program causes the computer to execute processes, procedures, or stages corresponding to the measured data acceptance unit 110, determination unit 120, and generation unit 130 with their "unit" being replaced by "process", "procedure", or "stage". A three-dimensional map generation method is a method that the three-dimensional map generation device 100 performs by executing the three-dimensional map generation program.

The three-dimensional map generation program may be stored in a computer-readable recording medium and provided in the form of the recording medium. Alternatively, the three-dimensional map generation program may be provided in the form of a program product.

*Description of Behavior*

Figure 2:
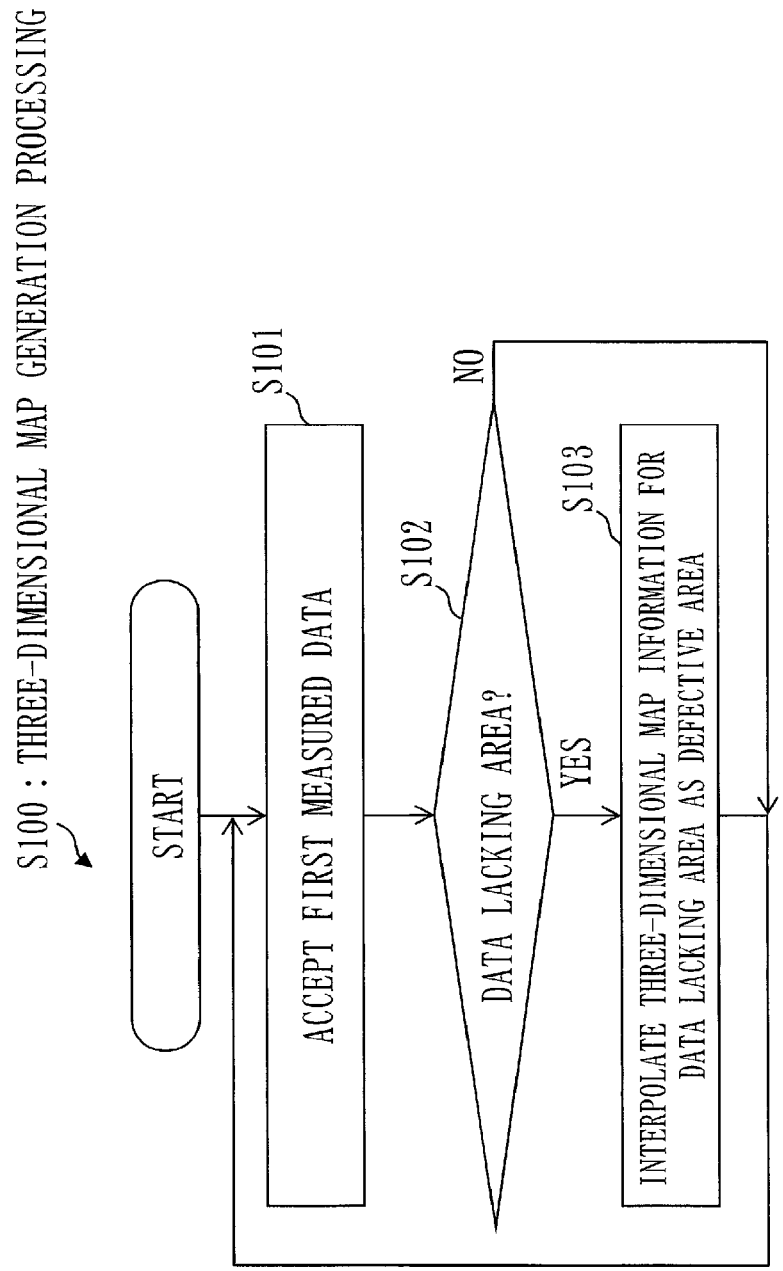
FIG. 2 is a flowchart of three-dimensional map generation processing according to Embodiment 1.

FIG. 2 is a flowchart of three-dimensional map generation processing S100 according to the present embodiment.

Figure 3:
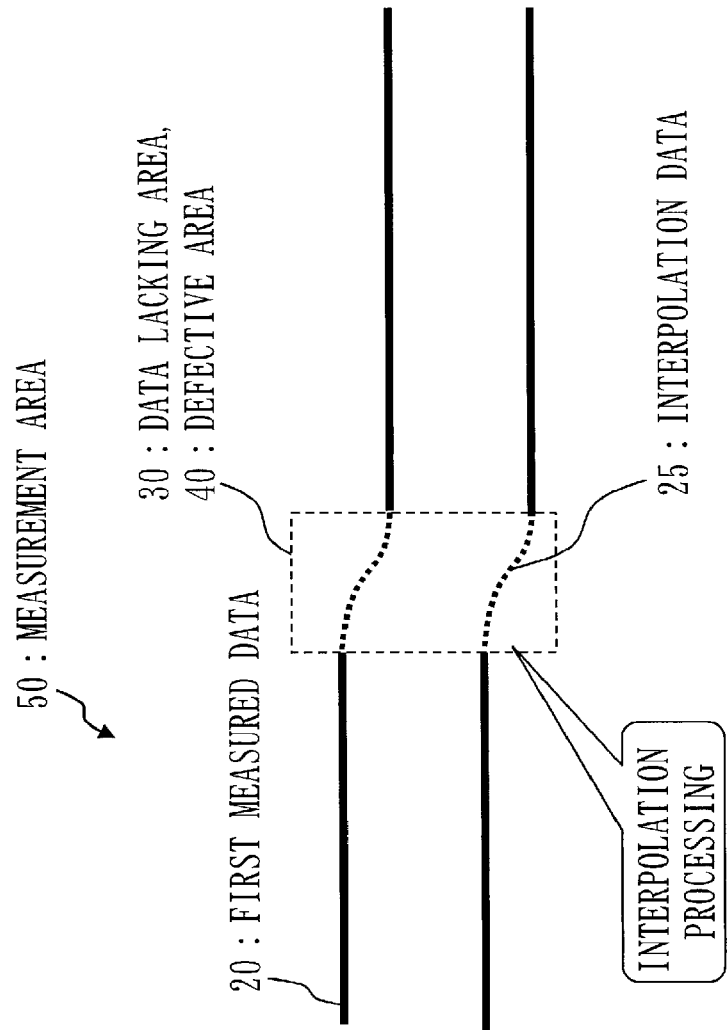
FIG. 3 is a schematic diagram illustrating three-dimensional map generation processing according to Embodiment 1.

FIG. 3 is a schematic diagram illustrating the three-dimensional map generation processing S100 according to the present embodiment.

According to three-dimensional map generation processing S100, the generation unit 130 generates the three-dimensional map information 11 expressing three-dimensional map, being static information such as road surface information, line information, and three-dimensional structure, in a real-time manner using the first measured data 20. In the present embodiment, when the determination unit 120 determines that there is a data lacking area 30, the generation unit 130 generates the three-dimensional map information 11 while interpolating static information of the data lacking area 30.

First, in step S101, the measured data acceptance unit 110 accepts the measured data acquired by the measuring vehicle 200, as the first measured data 20 via the communication device 930.

<Determination Process>

In step S102, the determination unit 120 determines the data lacking area 30 which lacks measured data for generating the three-dimensional map, out of the measurement area 50 based on the first measured data 20 transmitted from the measuring vehicle 200. Specifically, the determination unit 120 detects, from the first measured data 20, an area in which a white line ends off halfway or position information of the first measured data 20 involves an extreme fluctuation, and extracts the data lacking area 30 that lacks measured data. The first measured data 20 is also called point cloud data.

If it is determined that there is a data lacking area 30, the processing advances to step S103. If it is determined that there is no data lacking area 30, the ordinary three-dimensional map generation processing continues.

The determination process by the determination unit 120 is also called data lack extraction process.

<Interpolation Processing>

In step S103, the generation unit 130 acquires the data lacking area 30 from the determination unit 120. Then, the generation unit 130 regards the data lacking area 30 as a defective area 40, and generates interpolation data 25 for interpolating the three-dimensional map information of the defective area 40.

The data lacking area 30 is an area that lacks measured data for generating the three-dimensional map. The data lacking area 30 is an area acquired from the measurement area 50 based on the first measured data 20 transmitted from the measuring vehicle 200. The defective area 40 is an area that should be interpolated with the three-dimensional map information. Specifically, the generation unit 130 performs interpolation based on a mathematical model using an easement curve. Specific examples of the interpolation method using the mathematical model include arc interpolation, polynomial interpolation, and interpolation using polynomial for gaps between ends of straight lines.

As illustrated in FIG. 3, the generation unit 130 generates the interpolation data 25 which interpolates three-dimensional map information such as a dividing line on a road in the defective area 40, using an easement curve. At this time, the generation unit 130 interpolates the defective area 40 such that outward acceleration acting on a traveling vehicle traveling on the road in the defective area 40 at a traveling velocity V does not make the passenger uncomfortable. In a specific example, the generation unit 130 generates interpolation data 25 using arc interpolation with which outward acceleration acting on a traveling vehicle traveling at the traveling velocity V does not make the passenger uncomfortable.

The generation unit 130 generates the interpolation data 25 such that a lateral acceleration G, being a lateral centrifugal force acting on the traveling vehicle traveling on the road in the defective area 40 at the traveling speed V, becomes equal to or lower than a predetermined threshold value 12. At this time, the traveling velocity V is set to a speed limit of the road, or an average velocity of vehicles traveling on the road.

In general, the lateral acceleration G that makes a passenger uncomfortable is approximately 0.5 G. Hence, preferably the threshold value 12 is set to approximately 0.5 G.

That is, assume that the traveling speed is expressed as V, a radius of curvature of an arc portion of the road is expressed as R, and a gravitational acceleration is expressed as g, interpolation data 25 which interpolates the three-dimensional map information in the defective area 40 is generated using an easement curve that satisfies lateral acceleration $G=(V^2/R/g) \leq 0.5$ G.

As described above, the generation unit 130 generates the interpolation data 25 such that the lateral acceleration G acting on the traveling vehicle traveling on the road in the defective area 40 at the traveling velocity V becomes 0.5 G or less. More preferably, the generation unit 130 performs interpolation such that the the lateral acceleration G acting on the traveling vehicle traveling on the road in the defective area 40 at the traveling velocity V becomes 0.2 G or more and 0.3 G or less.

The data lacking area 30 according to the present embodiment is assumed to be a data lacking section of approximately 10 m. This is because data lack of approximately 10 m at maximum can be interpolated appropriately without performing additional measurement.

*Other Configurations*

The three-dimensional map generation device 100 may be provided with an input interface and an output interface. An input interface is a port to be connected to an input device such as a mouse, a keyboard, and a touch panel. The input interface is specifically a universal serial bus (USB) terminal. Alternatively, the input interface may be a port to be connected to a local area network (LAN).

An output interface is a port to be connected to a cable of an output apparatus such as a display. The output interface is specifically a USB terminal or a high definition multimedia interface (HDMI; registered trademark) terminal. The display is specifically a liquid crystal display (LCD).

In the present embodiment, the determination unit 120 automatically determines the data lacking area 30, that is, the defective area 40. Alternatively, the generation unit 130 may acquire, as the defective area 40, an area selected out of the measurement area 50 using the input device, via the input interface. That is, the three-dimensional map generation device 100 may acquire the defective area 40 designated by an operator using the input interface and the output interface. Specifically, the operator selects the defective area 40 of the first measured data 20 displayed on a monitor such as a touch panel, using a pen or the like. Then, the generation unit 130 may acquire the defective area 40 selected by the operator via the input interface, and generate the interpolation data 25 of the defective area 40.

In the present embodiment, the functions of the "units" of the three-dimensional map generation device 100 are implemented by software. In a modification, the functions of the "units" of the three-dimensional map generation device 100 may be implemented by hardware.

Specifically, the three-dimensional map generation device 100 may be provided with an electronic circuit in place of the processor.

The electronic circuit is a dedicated electronic circuit which implements the functions of the "units" of the three-dimensional map generation device 100.

The electronic circuit is specifically a single circuit, a composite circuit, a programmed processor, a parallel-programmed processor, a logic IC, a GA, an ASIC, or an FPGA. Note that GA stands for gate array, ASIC stands for application specific integrated circuit, and FPGA stands for field-programmable gate array.

The functions of the "units" of the three-dimensional map generation device 100 may be implemented by one electronic circuit or by a plurality of electronic circuits through distribution.

In another modification, some of the functions of the "units" of the three-dimensional map generation device 100 may be implemented by an electronic circuit, and the remaining functions may be implemented by software.

The processor and each electronic circuit are called processing circuitry as well. That is, the functions of the "units" of the three-dimensional map generation device 100 are implemented by processing circuitry.

*Description of Effect of Embodiment*

As described above, in the three-dimensional map generation system according to the present embodiment, the generation unit which generates the high-precision three-dimensional map has a function of interpolating a defective area resulting from lack of measured data. Hence, with the three-dimensional map generation system according to the present embodiment, even when measured data lacks, a data lacking area that lacks the measured data can be appropriately interpolated as a defective area.

In the three-dimensional map generation system according to the present embodiment, the generation unit sets the vehicle velocity to a predetermined value and interpolates the defective area using an easement curve so that the velocity will not make the passenger uncomfortable. Thus, with the three-dimensional map generation system according to the present embodiment, three-dimensional map information such as a dividing line on a road can be interpolated further appropriately.

Embodiment 2

In the present embodiment, a difference from Embodiment 1 will mainly be described. The same configuration as the configuration described in Embodiment 1 will be denoted by the same reference numeral as in Embodiment 1, and its description will be omitted.

* Description of Configuration*

Figure 4:
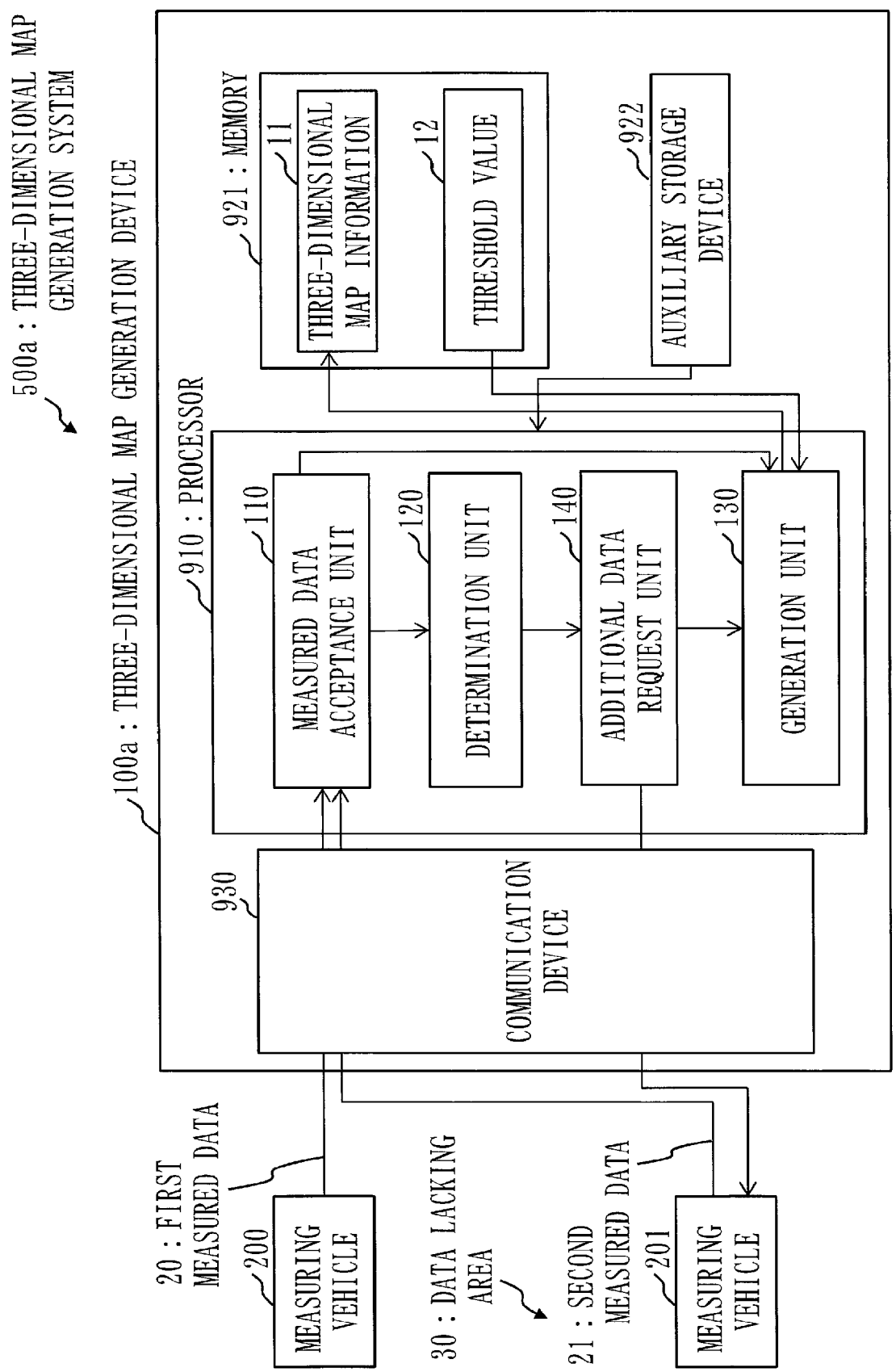
FIG. 4 is a configuration diagram of a three-dimensional map generation system and three-dimensional map generation device according to Embodiment 2.

FIG. 4 is a configuration diagram of a three-dimensional map generation system 500a and three-dimensional map generation device 100a according to the present embodiment.

In Embodiment 1, a mode is described in which the three-dimensional map generation system 500 interpolates the data lacking area 30 of approximately 10 m without performing additional measurement. In the present embodiment, a mode will be described in which a determination unit 120 has extracted a data lacking area 30 of approximately 10 m or more, for example, 20 m, to 50 m. When a data lacking area 30 of approximately 20 m to 50 m is extracted, the three-dimensional map generation system 500a performs additional measurement of the data lacking area 30, and generates three-dimensional map information 11 by seamlessly concatenating the original measured data and the additional measured data.

The three-dimensional map generation system 500a according to the present embodiment is provided with the three-dimensional map generation device 100a, a measuring vehicle 200, and a measuring vehicle 201 traveling in and around the data lacking area 30.

The three-dimensional map generation device 100a is provided with an additional data request unit 140, in addition to the constituent elements described in Embodiment 1.

The additional data request unit 140 requests measured data which the data lacking area 30 lacks, as second measured data 21. Via a communication device 930, the additional data request unit 140 requests the second measured data 21, being additional measured data for the data lacking area 30, from the measuring vehicle 201 traveling in and around the data lacking area 30.

A measured data acceptance unit 110 acquires the second measured data 21 from the measuring vehicle 201 via the communication device 930.

A generation unit 130 regards an area covering a boundary between first measured data 20 and the second measured data 21, as a defective area 40. The generation unit 130 generates interpolation data 25 which interpolates the three-dimensional map information of the defective area 40 to concatenate the first measured data 20 and the second measured data 21.

*Description of Behavior*

Figure 5:
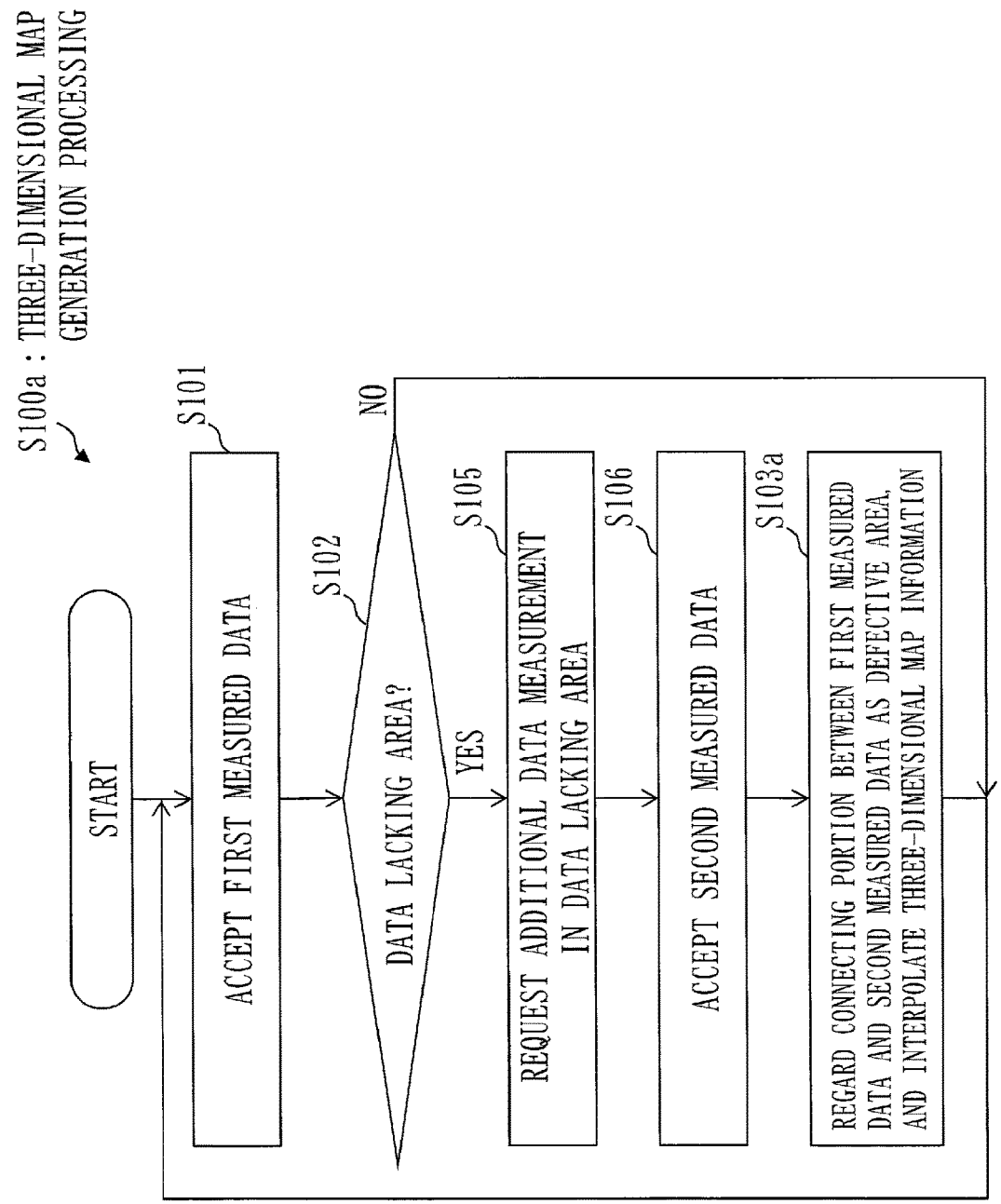
FIG. 5 is a flowchart of three-dimensional map generation processing according to Embodiment 2.

FIG. 5 is a flowchart of three-dimensional map generation processing S100a according to the present embodiment.

Figure 6:
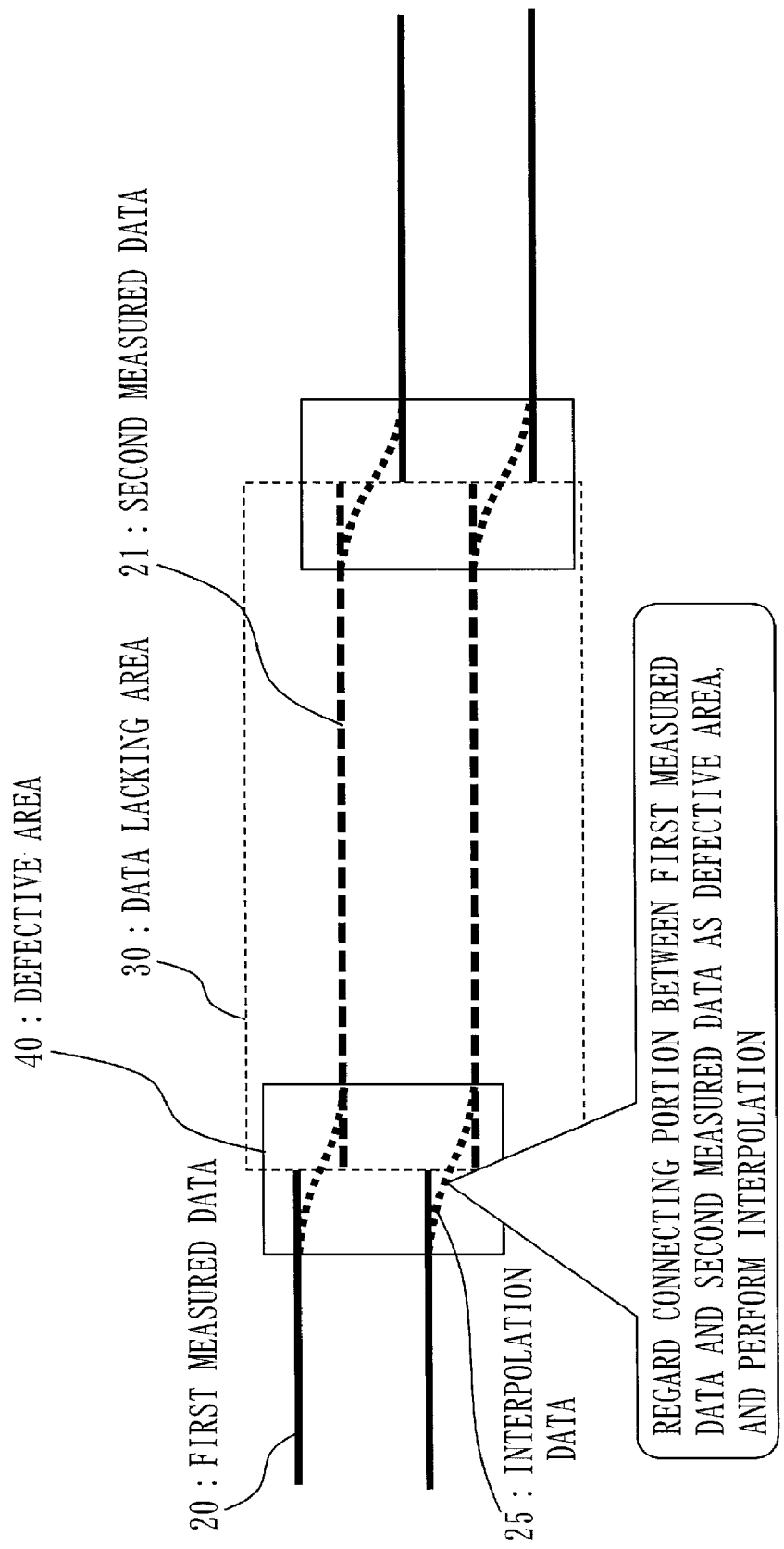
FIG. 6 is a schematic diagram illustrating three-dimensional map generation processing according to Embodiment 2.

FIG. 6 is a schematic diagram illustrating three-dimensional map generation processing S100a according to the present embodiment.

Processes of step S101 and step S102 are the same as those in Embodiment 1.

If it is determined that there is a data lacking area 30, processing advances to step S105. If it is determined that there is no data lacking area 30, ordinary three-dimensional map generation processing is continued.

In step S105, the additional data request unit 140 requests measured data which the data lacking area 30 lacks, as the second measured data 21.

Specifically, the determination unit 120 specifics an area number of the data lacking area 30. The additional data request unit 140 notifies the area number to the measuring vehicle 201 traveling in the vicinity of the data lacking area 30 specified by the area number, and requests the measuring vehicle 201 to measure measured data of the data lacking area 30. Alternatively, it may be possible to ask a measurement dealer to perform additional measurement. The measuring vehicle 201 performs additional measurement of the data lacking area 30. The measuring vehicle 201 transmits the second measured data 21 obtained by additional measurement to the three-dimensional map generation device 100a.

In step S106, the measured data acceptance unit 110 acquires the second measured data 21 via the communication device 930. The measured data acceptance unit 110 outputs the second measured data 21 to the generation unit 130.

In step S103a, the generation unit 130 regards an area covering boundary between first measured data 20 and the second measured data 21, as a defective area 40. The generation unit 130 generates the interpolation data 25 which interpolates the defective area 40 to concatenate the first measured data 20 and the second measured data 21 in the defective area 40. The generation unit 130 generates the interpolation data 25 to seamlessly concatenate the first measured data 20 and the second measured data 21 in the defective area 40.

In FIG. 6, an area covering the boundary between the first measured data 20 and the second measured data 21, being the additional measured data of the data lacking area 30, is regarded as the defective area 40. The generation unit 130 generates the interpolation data 25 that seamlessly connects the first measured data 20 and the second measured data 21 in the defective area 40.

An interpolation scheme of concatenating the first measured data 20 and the second measured data 21 seamlessly is the same as that described in Embodiment 1.

*Other Configurations*

In the present embodiment, the three-dimensional map generation device 100*a* is provided with the measured data acceptance unit 110, the determination unit 120, the generation unit 130, and the additional data request unit 140. Alternatively, a modification of the present embodiment may present a configuration in which a measuring vehicle 200 is provided with a determination unit 120 and an additional data request unit 140, and the three-dimensional map generation device 100*a* is provided with a measured data acceptance unit 110 and a generation unit 130.

In this case, the measuring vehicle 200 can request additional measurement while performing a data lack extraction process by the determination unit 120. Therefore, when data lack is extracted, the measuring vehicle 200 can perform additional measurement in a real-time manner.

*Description of Effect of Embodiment*

With the three-dimensional map generation system according to the present embodiment, additional measurement of a data lacking area is performed, and new measurement point cloud data obtained by additional measurement can be joined to old measurement point cloud data. When joining a series of first measured data and a series of second measured data, sometimes they are discontinuous. Even in the case of discontinuity, with the three-dimensional map generation system according to the present embodiment, a vicinity of a connecting portion between the first measured data and second measured data may be regarded as the defective area described in Embodiment 1, and the same interpolation processing as that of Embodiment 1 can be performed. Hence, with the three-dimensional map generation system according to the present embodiment, even in the case of additional measurement, higher-precision three-dimensional map information can be obtained.

Embodiment 3

In the present embodiment, a difference from Embodiment 2 will mainly be described. A configuration of a three-dimensional map generation device 100*a* is the same as that of Embodiment 2 and accordingly will not be illustrated. The same configuration as the configurations described in Embodiments 1 and 2 will be denoted by the same reference numeral as in Embodiments 1 and 2, and its description will be omitted.

In Embodiment 2, interpolation processing is performed by regarding a connecting portion between the first measured data 20 and the second measured data 21 which is obtained by additionally measuring the data lacking area 30, as the defective area 40. The present embodiment will describe a mode in which this technique of Embodiment 2 is applied to update of a three-dimensional map.

Figure 7:
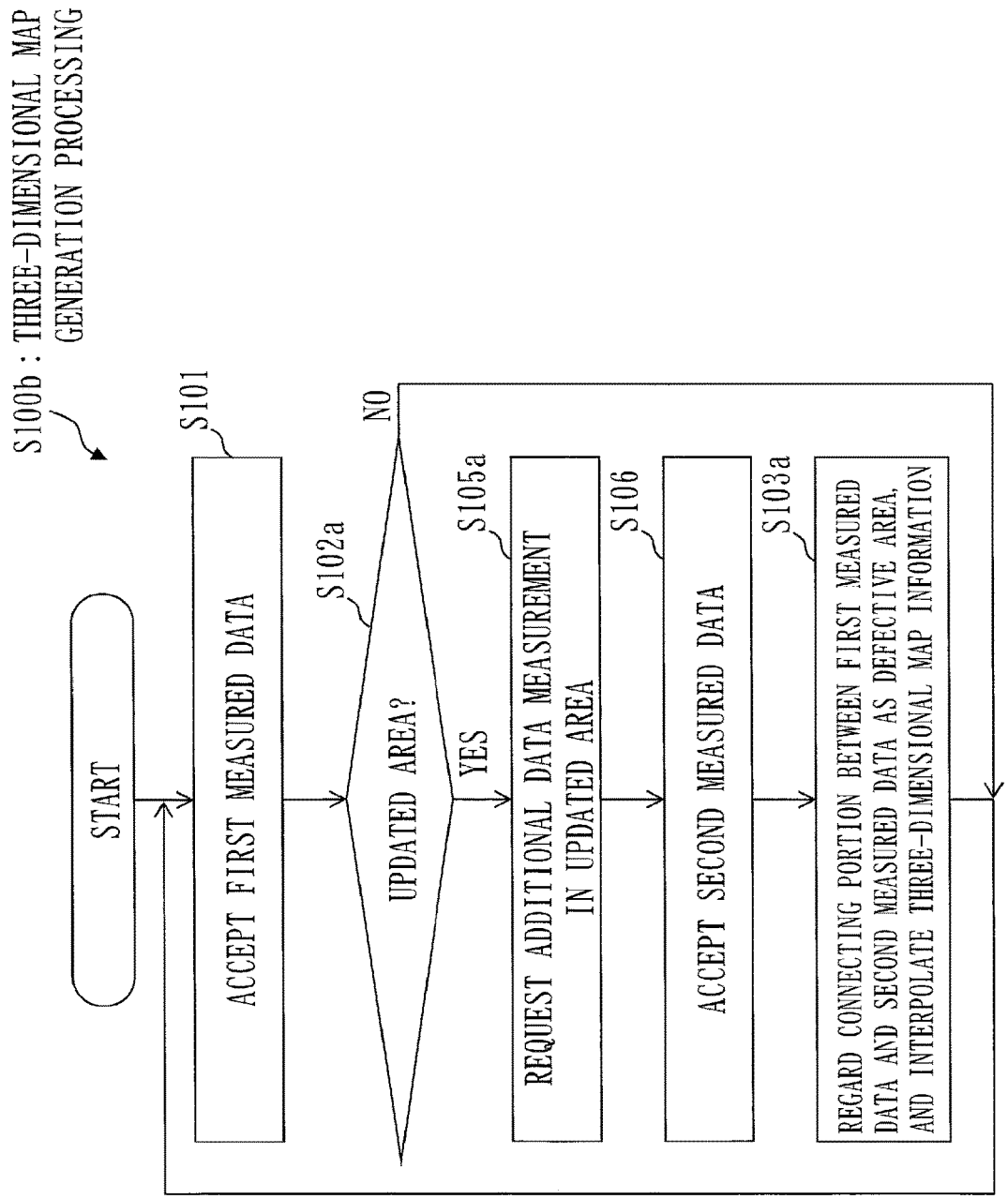
FIG. 7 is a flowchart of three-dimensional map generation processing according to Embodiment 3.

FIG. 7 is a flowchart of three-dimensional map generation processing S100*b* according to the present embodiment.

Figure 8:
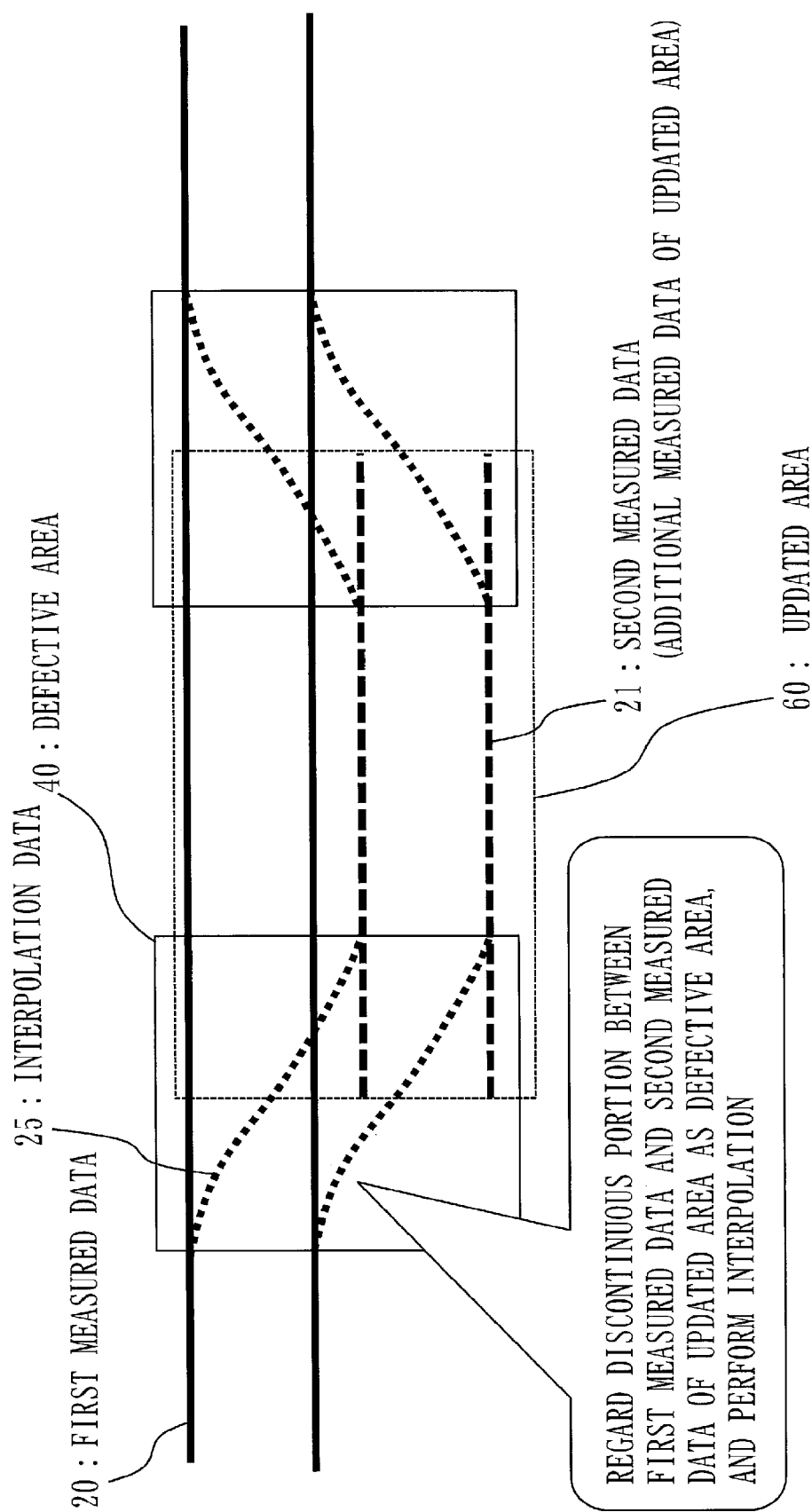
FIG. 8 is a schematic diagram illustrating the three-dimensional map generation processing according to Embodiment 3.

FIG. 8 is a schematic diagram illustrating three-dimensional map generation processing S100*b* according to the present embodiment.

A process of step S101 is the same as that of Embodiment 1.

In step S102*a*, a determination unit 120 acquires an updated area 60 in a measurement area 50 where a three-dimensional map is updated. Specifically, the determination unit 120 detects an updated portion of a road as the updated area 60 through contact from an organization such as a road administration company which is in charge of road administration.

In step S105*a*, an additional data request unit 140 requests measured data which the updated area 60 lacks, as second measured data 21. The additional data request unit 140 requests the second measured data 21 from a measuring vehicle 201 capable of acquiring second measured data. Specifically, the additional data request unit 140 asks a measuring vehicle 201 traveling in the vicinity of the updated area 60 to perform additional measurement. Alternatively, the additional data request unit 140 may ask a measurement dealer to perform additional measurement of the updated area 60.

A process of step S106 is the same as that of Embodiment 2. That is, a measured data acceptance unit 110 acquires the second measured data 21, being the additional measured data of the updated area 60, via a communication device 930. The measured data acceptance unit 110 outputs the second measured data 21 to a generation unit 130.

A process of step S103*a* is the same as that of Embodiment 2. That is, the generation unit 130 regards an area covering a boundary between first measured data 20 and the second measured data 21, being the additional measured data of the updated area 60, as a defective area 40. The generation unit 130 generates interpolation data 25 which interpolates the defective area 40 to concatenate the first measured data 20 and the second measured data 21.

In FIG. 8, an area covering the boundary between the first measured data 20 and the second measured data 21, being the additional measured data of the updated area 60, is regarded as the defective area 40. The generation unit 130 generates the interpolation data 25 that seamlessly connects the first measured data 20 and the second measured data 21 in the defective area 40.

An interpolation scheme of connecting the first measured data 20 and the second measured data 21 seamlessly is the same as that described in Embodiment 1.

*Description of Effect of Embodiment*

In this manner, with the three-dimensional map according to the present embodiment, an updating operation of a three-dimensional map can be performed in accordance with the same processing as that of Embodiment 2, by regarding the data lacking area in Embodiment 2 as an updated area. Hence, with the three-dimensional map generation system according to the present embodiment, map update can be automated.

Embodiment 4

In the present embodiment, a difference from Embodiments 1 to 3 will mainly be described.

A configuration of a three-dimensional map generation device 100 is the same as those of Embodiments 1 to 3 and accordingly will not be illustrated. The same configuration as the configurations described in Embodiments 1 to 3 will be denoted by the same reference numeral as in Embodiments 1 to 3, and its description will be omitted.

Figure 9:
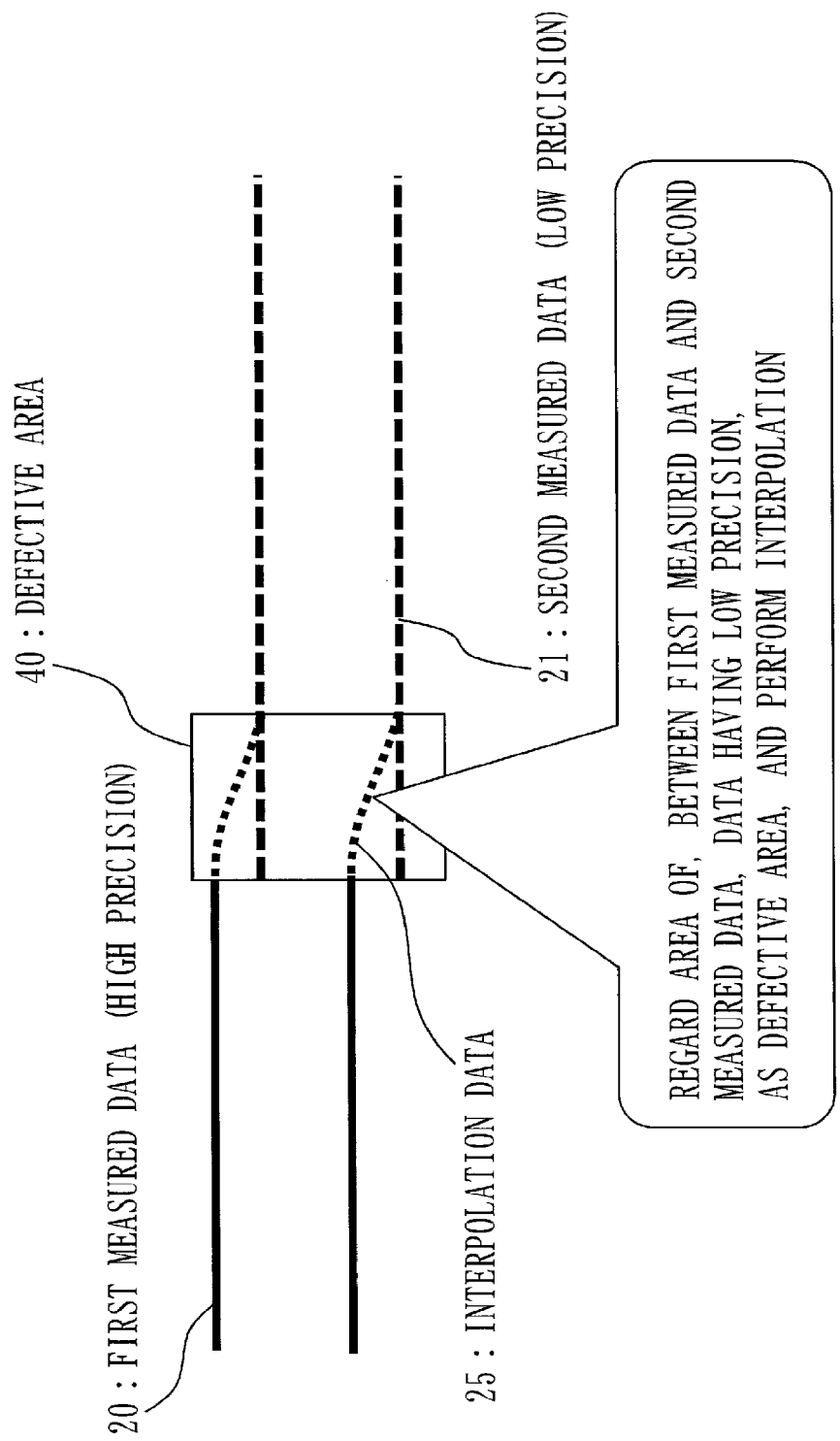
FIG. 9 is a schematic diagram illustrating an example of interpolation processing according to Embodiment 4.

FIG. 9 is a schematic diagram illustrating an example of interpolation processing according to the present embodiment Assume that in Embodiments 2 and 3, a difference in measurement precision, that is, whether good or bad, between the first measured data 20 and second measured data 21 is known. In such a case, in the present embodiment, a vicinity of a connection of measured data having bad measurement precision is regarded as a defective area 40, and interpolation processing described in Embodiment 1 is performed. Good/bad measurement precision is expressed by a high/low precision level.

As illustrated in FIG. 9, a generation unit 130 compares the precision of the first measured data 20 with the precision of the second measured data 21. The generation unit 130 regards an area of measured data having low precision, as a defective area 40, and generates interpolation data 25 for the defective area 40.

A high/low precision level is determined based on information such as arrangement of dilution of precision (Dop) expressing an influence which arrangement of GPS satellites exerts on positioning precision, precision of point cloud raw data, and a FIX rate being a ratio at which a high-precision solution by SNSS positioning is calculated.

In FIG. 9, interpolation processing is performed by regarding a portion of, between the first measured data 20 and the second measured data 21, a measured data that has a low precision, as the defective area 40. That is, the second measured data 21 having the low precision is replaced by the interpolation data 25.

Figure 10:
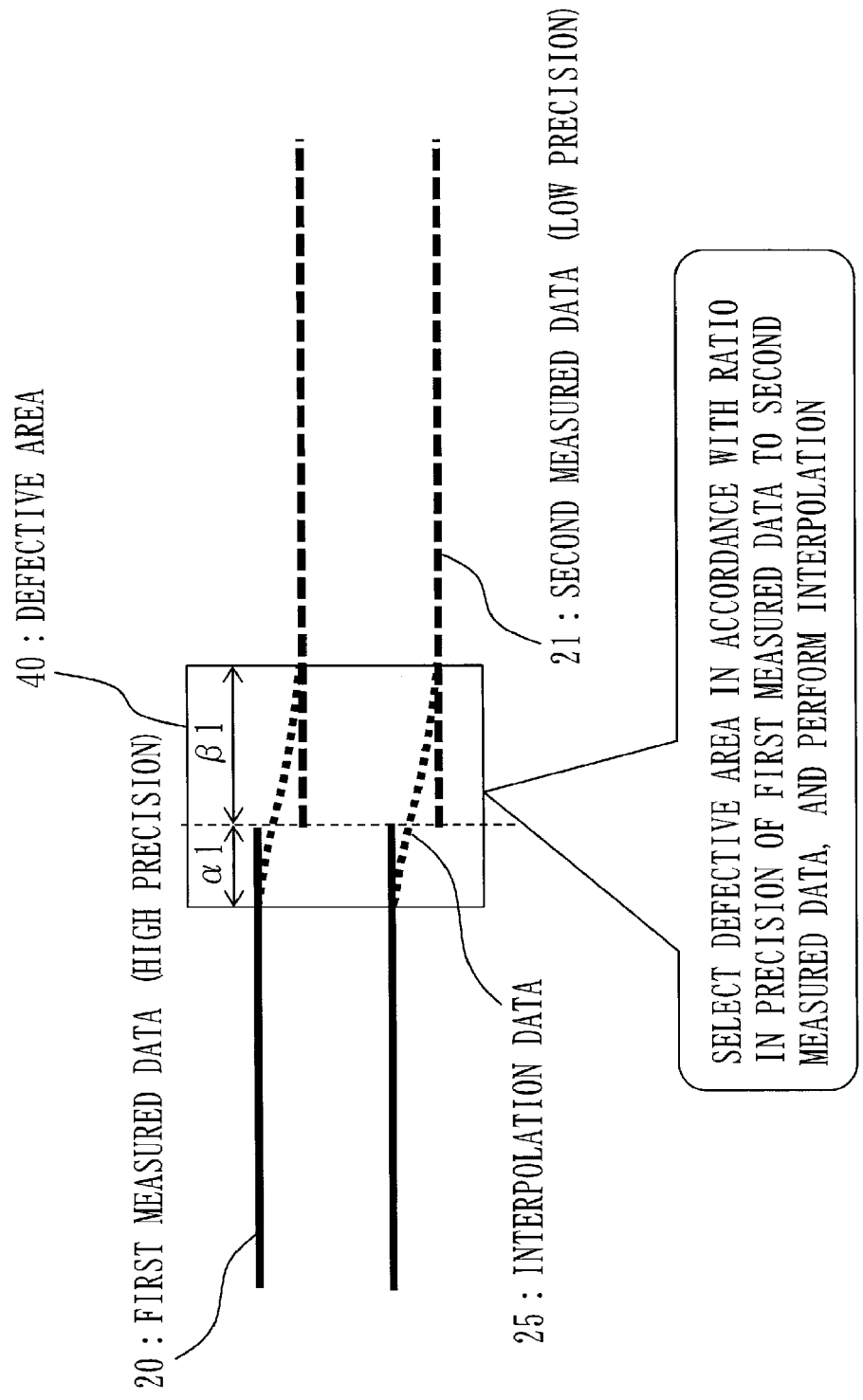
FIG. 10 is a schematic diagram illustrating another example of interpolation processing according to Embodiment 4.

FIG. 10 is a schematic diagram illustrating another example of interpolation processing according to Embodiment 4.

As illustrated in FIG. 10, the generation unit 130 may select the defective area 40 based on a ratio of the precision of the first measured data 20 to the precision of the second measured data 21.

Assume that in the defective area 40, a proportion of a length of the first measured data 20 to a length of the second measured data 21 is α1: β1. When the precision of the first measured data 20 is higher than the precision of the second measured data 21, the defective area 40 is selected to satisfy α1<β1. For example, if the precision of the first measured data 20 is 90% and the precision of the second measured data 21 is 60%, the ratio of the precision of the first measured data 20 to the precision of the second measured data 21 is 3:2. Alternatively, in this case, the defective area 40 may be selected to satisfy α1: β1=2:3.

As described above, with the three-dimensional map generation system according to the present embodiment, the measurement point could data having bad precision can be adapted to the measurement point cloud data having good precision. Thus, higher-precision three-dimensional map information can be generated.

Embodiment 5

In the present embodiment, a difference from Embodiments 1 to 4 will mainly be described.

A configuration of a three-dimensional map generation device 100 is the same as those in Embodiments 1 to 4 and accordingly will not be illustrated. The same configuration as the configurations described in Embodiments 1 to 4 will be denoted by the same reference numeral as in Embodiments 1 to 4, and its description will be omitted.

FIG. 11 is a schematic diagram illustrating an example of interpolation processing according to the present embodiment.

The present embodiment will describe interpolation processing of a case where interpolation processing is performed by regarding a connecting portion between first measured data 20 and second measured data 21, being additional measured data of an updated area 60, as a defective area 40.

In FIG. 11, a generation unit 130 sets interim measured data 23 to be located between the first measured data 20 and the second measured data 21 in the updated area 60, based on precision of the first measured data 20 to precision of the second measured data 21. Then, the generation unit 130 generates interpolation data 25 which concatenates the first measured data 20 and the interim measured data 23 in the defective area 40 covering the connecting portion between the first measured data 20 and the interim measured data 23.

The high/low precision level is determined based on information such as Dop arrangement, precision of point cloud raw data, and a FIX rate, as in Embodiment 4.

In FIG. 11, the generation unit 130 sets the interim measured data 23 in the updated area 60 based on a ratio of the precision of the first measured data 20 to the precision of the second measured data 21.

Assume that in the updated area 60, a proportion of a distance from the first measured data 20 until the interim measured data 23 to a distance from the second measured data 21 until the interim measured data 23 is α2: β2. When the precision of the first measured data 20 is lower than the precision of the second measured data 21, the interim measured data 23 is set to satisfy α2>β2. For example, if the precision of the first measured data 20 is 45% and the precision of the second measured data 21 is 90%, the ratio of the precision of the first measured data 20 to the precision of the second measured data 21 is 1:2. Alternatively, in this case, the interim measured data 23 may be set to satisfy α2: β2=2:1.

As described above, with the three-dimensional map generation system according to the present embodiment, the measured data of the updated area can be set with using weighting that is based on the precision of the measured data. Hence, higher-precision three-dimensional map information can be obtained.

In the embodiments described above, individual "units" serving as independent function blocks constitute the three-dimensional map generation system. The configuration of the three-dimensional map generation system need not be the configuration described above. The three-dimensional map generation system can have any configuration. The function blocks of the three-dimensional map generation system are arbitrary as far as they can implement the functions described in the above embodiments. The three-dimensional map generation system may be configured by any other combination of these function blocks, or by any block configuration.

Having described Embodiments 1 to 5, a plurality of portions of the embodiments may be combined and practiced. Alternatively, of these embodiments, only one portion may be practiced. Also, these embodiments may be practiced entirely or partially by any combination.

The above embodiments are essentially preferable exemplifications and are not intended to limit the present invention, an applied product of the present invention, and a scope of usage of the present invention, and various changes can be made in the embodiments as necessary.

REFERENCE SIGNS LIST

11: three-dimensional map information; 12: threshold value; 20: first measured data; 21: second measured data; 23: interim measured data; 25: interpolation data; 30: data lacking area; 40: defective area; 50: measurement area; 60: updated area; 100, 100a: three-dimensional map generation device; 110: measured data acceptance unit; 120: determination unit; 130: generation unit; 140: additional data request unit; 200, 201: measuring vehicle; 500, 500a, 500b: three-dimensional map generation system; 910: processor; 921: memory; 922: auxiliary storage device; 930: communication device; S100, S100a, S100b: three-dimensional map generation processing

The invention claimed is:

1. A three-dimensional map generation system which generates three-dimensional map information expressing a three-dimensional map used for automated driving, using measured data acquired by a measuring vehicle which moves within a measurement area, the three-dimensional map generation system comprising:
processing circuitry
to regard, as a defective area, a data lacking area which is acquired from the measurement area based on first measured data transmitted from the measuring vehicle, which lacks measured data for generating the three-dimensional map, and in which measured data cannot be acquired by the measuring vehicle when there is an automobile traveling parallel to the measuring vehicle, or when there is a parked/stopped vehicle, and
to generate interpolation data for interpolating three-dimensional map information of the defective area,
wherein the processing circuitry generates the interpolation data which interpolates the three-dimensional map information of the defective area by an easement curve.

2. The three-dimensional map generation system according to claim 1, wherein the processing circuitry
determines the data lacking area based on the first measured data, and
requests measured data which the data lacking area lacks, as second measured data, when the data lacking area has a length that needs additional measurement.

3. The three-dimensional map generation system according to claim 2, wherein the processing circuitry requests the second measured data when the data lacking area is of 10 m or more.

4. The three-dimensional map generation system according to claim 2, wherein the processing circuitry regards an area covering a boundary between the first measured data and the second measured data, as the defective area that should be interpolated with the three-dimensional map information, and generates the interpolation data which interpolates the three-dimensional map information of the defective area to concatenate the first measured data and the second measured data.

5. A three-dimensional map generation system which generates three-dimensional map information expressing a three-dimensional map used for automated driving, using measured data acquired by a measuring vehicle which moves within a measurement area, the three-dimensional map generation system comprising:
processing circuitry
to regard an area covering a boundary between first measured data and second measured data, as a defective area that should be interpolated with the three-dimensional map information, the first measured data lacking measured data to generate the three-dimensional map by an automobile traveling parallel to the measuring vehicle, or by a parked/stopped vehicle, the second measured data being additional measured data for a data lacking area acquired from the measurement area based on the first measured data, and
to generate interpolation data for interpolating three-dimensional map information of the defective area to concatenate the first measured data and the second measured data,
wherein the processing circuitry generates the interpolation data which interpolates the three-dimensional map information of the defective area by an easement curve.

6. The three-dimensional map generation system according to claim 5, wherein the processing circuitry
determines the data lacking area based on the first measured data transmitted from a first measuring vehicle, and
requests measured data which the data lacking area lacks, as second measured data, from a second measuring vehicle which can acquire the second measured data, when the data lacking area has a length that needs additional measurement.

7. The three-dimensional map generation system according to claim 6, wherein the processing circuitry requests the second measured data when the data lacking area is of 10 m or more.

8. The three-dimensional map generation system according to claim 6, wherein the processing circuitry requests measured data which an updated area lacks, as second measured data, the updated area being an area in the measured area where a three-dimensional map is updated.

9. The three-dimensional map generation system according to claim 8, wherein the processing circuitry sets interim measured data to be located between the first measured data and the second measured data in the updated area, based on precision of the first measured data and precision of the second measured data, and generates the interpolation data which concatenates the first measured data and the interim measured data in the defective area.

10. The three-dimensional map generation system according to claim 6, comprising:
a three-dimensional map generation device to communicate with the measuring vehicle,
wherein the processing circuitry comprises processing circuitry of the three-dimensional map generation device, and
wherein the processing circuitry of the three-dimensional map generation device determines the data lacking area, generates the interpolation data, and requests the second measured data.

11. The three-dimensional map generation system according to claim 6, comprising the measuring vehicle and a three-dimensional map generation device which communicates with the measuring vehicle,
wherein the processing circuitry comprises processing circuitry of the measuring vehicle and processing circuitry of the three-dimensional map generation device,
wherein the processing circuitry of the measuring vehicle determines the data lacking area and requests the second measured data, and
wherein the processing circuitry of the three-dimensional map generation device generates the interpolation data.

12. The three-dimensional map generation system according to claim 5, wherein the easement curve is such that a lateral acceleration G, being a lateral centrifugal force acting on a traveling vehicle traveling on a road in the defective area at a traveling speed, becomes equal to or lower than a predetermined threshold value.

13. The three-dimensional map generation system according to claim 12, wherein the threshold value is 0.5 G.

14. The three-dimensional map generation system according to claim 5, wherein the processing circuitry generates the interpolation data using arc interpolation.

15. The three-dimensional map generation system according to claim 5, wherein the processing circuitry compares precision of the first measured data with precision of the second measured data, regards an area of measured data having low precision, as the defective area, and generates the interpolation data for the defective area.

16. The three-dimensional map generation system according to claim 5, wherein the processing circuitry selects the defective area based on a ratio of precision of the first measured data to precision of the second measured data.

17. The three-dimensional map generation system according to claim 5, comprising an input interface connected to an input device,
wherein the processing circuitry acquires, as the defective area, an area selected out of the measurement area using the input device, via the input interface.

18. A three-dimensional map generation method for a three-dimensional map generation system which generates three-dimensional map information expressing a three-dimensional map used for automated driving, using measured data acquired by a measuring vehicle which moves within a measurement area, the three-dimensional map generation method comprising:
regarding, as a defective area, a data lacking area which is acquired from the measurement area based on first measured data transmitted from the measuring vehicle, which lacks measured data for generating the three-dimensional map, and in which measured data cannot be acquired by the measuring vehicle when there is an automobile traveling parallel to the measuring vehicle, or when there is a parked/stopped vehicle, and
generating interpolation data for interpolating three-dimensional map information of the defective area,
the interpolation data which interpolates the three-dimensional map information of the defective area is generated by an easement curve.

19. A non-transitory computer readable medium storing a three-dimensional map generation program for a three-dimensional map generation system which generates three-dimensional map information expressing a three-dimensional map used for automated driving, using measured data acquired by a measuring vehicle which moves within a measurement area, the three-dimensional map generation program causing a computer to execute:
an interpolation process of regarding, as a defective area, a data lacking area which has been acquired from the measurement area based on first measured data transmitted from the measuring vehicle, which lacks measured data for generating the three-dimensional map, and in which measured data cannot be acquired by the measuring vehicle when there is an automobile traveling parallel to the measuring vehicle, or when there is a parked/stopped vehicle, and generating interpolation data for interpolating three-dimensional map information of the defective area,
the interpolation data which interpolates the three-dimensional map information of the defective area is generated by an easement curve.

* * * * *